(12) United States Patent
McCoog et al.

(10) Patent No.: US 7,647,074 B2
(45) Date of Patent: Jan. 12, 2010

(54) CELLULAR TELEPHONE WITH PRINT PREVIEW SYSTEM

(75) Inventors: Phillip A. McCoog, Portland, OR (US); Leo Robert Blume, Palo Alto, CA (US); Rabindra Pathak, Vancouver, WA (US); Michael Strittmatter, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1295 days.

(21) Appl. No.: 10/463,744

(22) Filed: Jun. 16, 2003

(65) Prior Publication Data

US 2004/0253990 A1 Dec. 16, 2004

(51) Int. Cl.
*H04B 1/38* (2006.01)
*H04M 1/00* (2006.01)

(52) U.S. Cl. ................ 455/566; 455/426.1; 455/426.2; 455/556.1

(58) Field of Classification Search ............... 455/41.2, 455/424, 426.1, 426.2, 556.1, 557, 566; 358/1.15, 358/1.16
See application file for complete search history.

(56) References Cited

U.S. PATENT DOCUMENTS

| 6,553,240 | B1 * | 4/2003 | Dervarics ................ 455/566 |
| 6,912,374 | B2 * | 6/2005 | Clough et al. ............ 455/41.2 |
| 6,965,450 | B2 * | 11/2005 | Sweetland et al. ......... 358/1.18 |
| 6,987,580 | B2 * | 1/2006 | Watanabe et al. .......... 358/1.15 |

(Continued)

FOREIGN PATENT DOCUMENTS

| EP | 0803795 A1 | 10/1997 |
| EP | 0933692 A2 | 8/1999 |

(Continued)

OTHER PUBLICATIONS

European Search report for Patent Application No. EP04253471 (Sep. 28, 2004).

(Continued)

*Primary Examiner*—Nay A Maung
*Assistant Examiner*—Tuan H Nguyen

(57) ABSTRACT

In one embodiment, a print control system is provided for use in a cellular telephone. A printing logic is configured to generate printer-ready data from a selected data to be printed. A viewing logic is configured to interpret and display the printer-ready data to simulate a printed state of the printer-ready data.

29 Claims, 3 Drawing Sheets

U.S. PATENT DOCUMENTS

| | | | |
|---|---|---|---|
| 2001/0034747 A1 | 10/2001 | Fujitani et al. | |
| 2001/0055121 A1* | 12/2001 | Omura et al. | 358/1.9 |
| 2002/0046238 A1* | 4/2002 | Estavillo et al. | 709/203 |
| 2002/0051184 A1 | 5/2002 | Fritz et al. | |
| 2002/0059278 A1 | 5/2002 | Bailey et al. | |
| 2002/0169002 A1* | 11/2002 | Imbrie et al. | 455/557 |
| 2002/0171857 A1* | 11/2002 | Hisatomi et al. | 358/1.13 |
| 2003/0078965 A1 | 4/2003 | Cocotis et al. | |
| 2003/0079030 A1* | 4/2003 | Cocotis et al. | 709/229 |
| 2003/0093675 A1* | 5/2003 | Hibino et al. | 713/168 |
| 2003/0140095 A1* | 7/2003 | Simpson et al. | 709/203 |
| 2003/0179112 A1* | 9/2003 | Parry et al. | 341/50 |
| 2003/0200507 A1* | 10/2003 | Stern et al. | 715/517 |
| 2004/0066529 A1* | 4/2004 | Wu et al. | 358/1.15 |
| 2004/0169880 A1 | 9/2004 | Nakanishi et al. | |
| 2004/0205453 A1* | 10/2004 | Mortensen | 715/500 |
| 2007/0240042 A1* | 10/2007 | Sato | 715/527 |

FOREIGN PATENT DOCUMENTS

| | | |
|---|---|---|
| EP | 1396785 A1 | 3/2004 |
| WO | WO 03/008196 | 1/2003 |

OTHER PUBLICATIONS

Translation of Japan Office Action dated Aug. 1, 2006 for Japan Patent Application No. 2004-176,369 (2 pgs).

Oak Technology, "XPI Embedded XHTML-Print Interpreter", (http://www.oaktech.com/products/imaging/software/ips/xhtml.html, 2003.

* cited by examiner

CELLULAR TELEPHONE WITH PRINT PREVIEW SYSTEM

BACKGROUND

Mobile communication devices like mobile cellular phones typically have limited resources and thus have less functionality than a computer. Functions, such as printing capabilities, typically need additional processing power and memory which may not be available on a mobile device.

BRIEF DESCRIPTION OF THE DRAWINGS

It will be appreciated that illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa.

DETAILED DESCRIPTION OF ILLUSTRATED EMBODIMENTS

Figure 1:
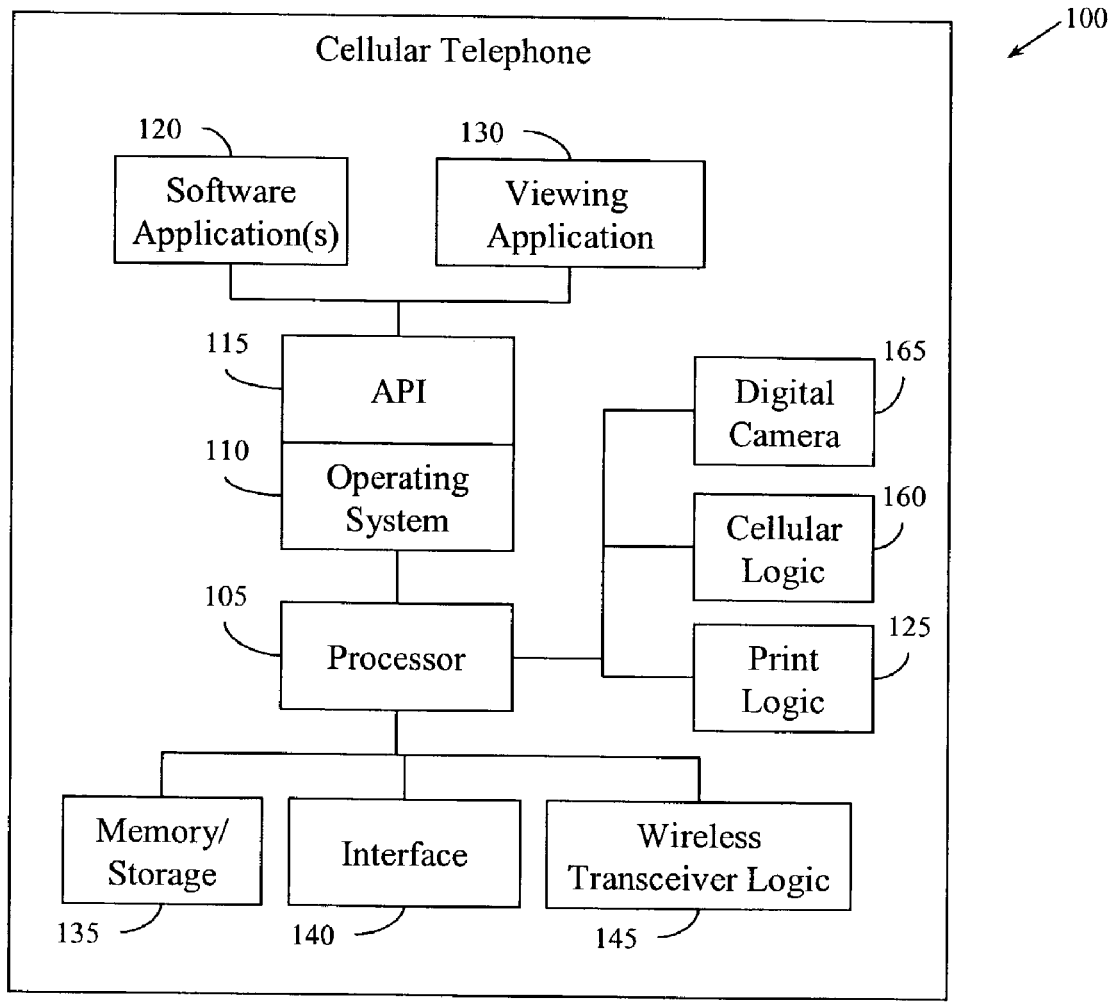
FIG. 1 is an example system diagram of a cellular telephone.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Computer-readable medium", as used herein, refers to any storage medium that participates in directly or indirectly storing, instructions and/or data to one or more processors for execution. Such a medium may take many forms, including but not limited to, non-volatile media, and volatile media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, any other physical medium with patterns of holes, a RAM, a PROM, an EPROM, a FLASH-EPROM, any other memory chip or card, or any other storage medium from which a computer, a processor or other electronic device can read.

"Logic", as used herein, includes but is not limited to hardware, firmware embedded in the memory, software stored on the computer medium, and/or combinations of each to perform a function(s) or an action(s), and/or to cause a function or action from another component. For example, based on a desired application or needs, logic may include microprocessor control by the software, discrete logic such as an application specific integrated circuit (ASIC), a programmable/programmed logic device, memory device containing instructions, or the like.

"Software", as used herein, includes but is not limited to one or more computer readable and/or executable instructions that cause a computer or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software may be dependent on, for example, requirements of a desired application, the environment it runs on, and/or the desires of a designer/programmer or the like.

"User", as used herein, includes but is not limited to one or more persons, software, computers or other devices, or combinations of these.

In one embodiment, a cellular telephone is provided that is print-enabled and is configured to provide a print preview of data desired to be printed. In one example, the cellular telephone can provide a self-contained or self-operable print preview system that operates without using resources from another device and/or communicating with devices external to the cellular telephone.

Illustrated in FIG. 1 is one embodiment of a cellular telephone 100 that is configured for wireless communication. The cellular telephone 100 may be embodied in a variety of forms and may include a variety of features. It will be appreciated that components described herein can also apply to other mobile devices like a personal digital assistant, a digital camera, a digital camera enabled mobile phone, or other type of hand-held, portable processing device. The cellular telephone 100 may include a processing system that has, for example, a processor 105, an operating system 110, and an application program interface (API) 115 to provide communication between one or more software applications 120 and the operating system 110.

In one embodiment, the cellular telephone 100 is print-enabled and includes print logic 125 that can be configured to prepare a print job for wireless transmission and cause the cellular telephone 100 to transmit the print job to a selected image forming device for printing. For example, in response to an instruction to print a selected file, the print logic 125 would generated print ready data from the selected file where the print ready data is in a format that is interpretable by an image forming device selected to print the selected file.

In one embodiment, the print ready data is based on a markup language like a hypertext markup language. One example includes XHTML-print but others can be used such as HTML, or any desired page description language. In general, the markup language is a device-independent format which allows the print logic 125 to create print ready data without a device-specific printer driver associated with a selected image forming device. In this case, the cellular telephone 100 can transmit the print ready data to any image forming device configured to interpret the same format of the print ready data. For example, both the cellular telephone 100 and a selected image forming device can be configured based on the same printing protocol like the Bluetooth Print Profile protocol.

Prior to transmitting the print ready data to an image forming device, a user may wish to preview what will be printed to determine how it may look like. In this regard, the print logic 125 is configured with a print preview feature that, in response to a print preview request, can display a simulated print of the print ready data. The cellular telephone 100 can include an viewing application 130 that is capable of interpreting the print ready data and displaying it. In one embodiment, the viewing application 130 is a web browser. For example, in response to a print preview request on a selected content, the print logic 125 can convert the selected content to a print ready data, and cause the viewing application 130 to read the print ready data and display a print preview. Since the print ready data is in a device independent format, the viewing application 130 should be able to display a simulated print version that can be substantially identical to a hard copy print of the selected content. In this manner, the cellular telephone 100 can be configured to render print ready data and provide a print preview independent of external/remote devices such as print servers, computers, imaging devices, and the like.

Other components of the cellular telephone 100 may include memory and/or storage 135 that can include any type of computer-readable medium. The storage 135 may also include a port that accepts and reads data stored on a removable memory card or other removable computer-readable medium. An interface 140 can include a display screen, one or more buttons, a pointing device, or other types of devices that can communicate data to a user and receive input from a user. To perform wireless communication, a wireless transceiver logic 145 is provided. Depending on the wireless communication protocol desired, the transceiver logic 145 can be configured according to different specifications.

In one embodiment, the wireless protocol is based on Bluetooth and the transceiver logic 145 would include a Bluetooth radio and antenna. The Bluetooth specification can be found at www.bluetooth.org. Other protocols include IEEE 802.11, details of which can be found on the Internet at www.ieee802.org., or other available wireless protocols. In one embodiment, the wireless transceiver logic 145 can include a radio frequency transceiver configured to transmit and receive radio frequency signals but could also be any type of transceiver having a low power transmitter capable of short distance transmissions (e.g. less than 100 meters). Infrared communication can also be used. The transceiver logic 145 may be embodied as a microchip within the cellular telephone 100, or can be configured on a removable device such as a PCMCIA card (PC card) that can be connected and disconnected to the cellular telephone 100 via a connection port or slot. The wireless transceiver logic 145 may also include cellular communication logic (not shown) configured to provide communication with cellular networks. The cellular communication logic may also be a separate component from the transceiver logic 145 such as cellular logic 160. As another example, in one embodiment the cellular telephone 100 can include a digital camera 165.

Figure 2:
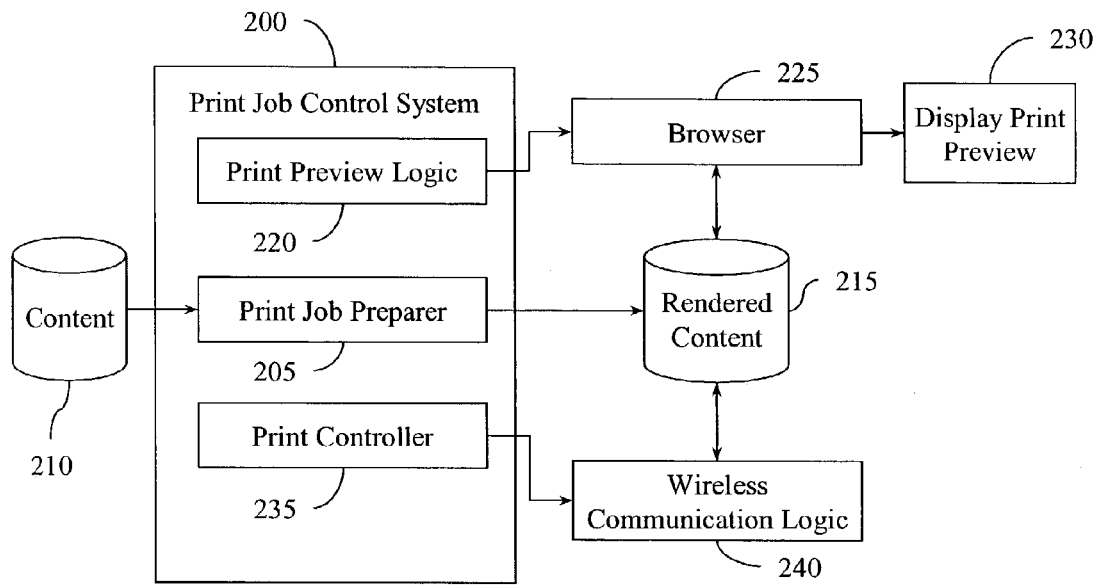
FIG. 2 is one embodiment of a print job control system for a cellular telephone.

Illustrated in FIG. 2 is one embodiment of a print job control system 200 configured to provide printing and print preview capabilities for a mobile communication device like a cellular telephone. Some or all components of the print job control system 200 can be embodied as software and/or logic that can be loaded and installed on a cellular telephone. A print job preparer 205 can be configured to receive content 210 that has been selected to be printed. The content 210 can be any object like a data file, email message, content in memory, and the like. The content 210 can be in a variety of forms such as a document, an image, or other file type created by an application whether local to or remote from the cellular telephone. Typically, the content 210 is in a format that is not understandable or interpretable by an image-forming device and thus needs to be processed into a format that can be interpreted by a selected image-forming device prior to transmitting the data.

In one example, the print job preparer 205 is configured to generate a rendered content 215 from the content 210 or otherwise convert the content 210 into a rendered print ready format. The rendered content 215 includes print-ready data that is interpretable by an image-forming device. One embodiment of the rendered content 215 is based on a device-independent format such as a page description language, other type of mark-up language like XHTML (extensible hypertext markup language), a portable document format (PDF), and the like. For example, the print job preparer 205 can be configured to use one or more pre-defined XHTML templates that contain variable and static components. The template can be combined with the content 210 in order to generate the rendered content 215. The variable components are configured for the content 210 and the static components can be pre-generated styles, graphics, images, text, and the like that can be used to enhance the printed version of the content 210. Using a template can reduce processing time and resources for generating the rendered content 215. Of course, other types of templates can be used based on other languages besides XHTML. It will be appreciated that the rendered content 215 may be stored as a local object like a file, data in a local memory buffer, or an object stored in another type of computer-readable medium available on the cellular telephone. Using the rendered content 215, the print job preparer 205 generates a print job that is configured for wireless transmission to an imaging forming device.

The print job control system 200 can also include a print preview logic 220 configured to provide a preview of what the content 210 will substantially look like once printed in hard copy form. Since the rendered content 215 is in a device independent rendered format like a markup language, a viewing application such as a web browser 225 can be used that can read the markup language. Thus, the markup language can make the content 210 into a viewable format. It will be appreciated that the data in the viewable format can be used as part of a print job that is transmittable to an image forming device since the viewable format is also print ready data/instructions. The print preview logic 220 is configured to be operable within the cellular telephone to provide an internal print preview component without communicating with external devices to render and/or display the print preview.

For example, in response to a print preview request, the print preview logic 220 can cause the browser 225 to access the rendered content 215, read the print ready data, and display a print preview 230 of the rendered content 215. In one example, the print job preparer 205 stores the rendered content 215 as a local file on the cellular telephone. The browser 225 can then access the rendered content 215 with a local access request. It will be appreciated that accessing the rendered content 215 can also include delivering the content to the browser 225. In the example where the rendered format in based on XHTML, the browser 225 would be configured to interpret and display XHTML. Thus, the displayed print preview 230 would represent a simulated print state of the content 210 when physically printed by an image forming device since the image forming device would also be configured to interpret the XHTML format of the rendered content 215 as part of a wirelessly transmitted print job.

With further reference to FIG. 2, a print controller 235 can be included that is configured to control a print job from the cellular telephone and to cause the cellular telephone to transmit the print job, including the rendered content 215, to a selected image forming device. In one embodiment, the print controller 235 causes a wireless communication logic 240 to establish a communication link with an image forming device (if the link is not already established) and transmit the print job for imaging. The wireless communication logic 240 can be configured similar to the wireless transceiver logic 145 shown in FIG. 1.

Figure 3:
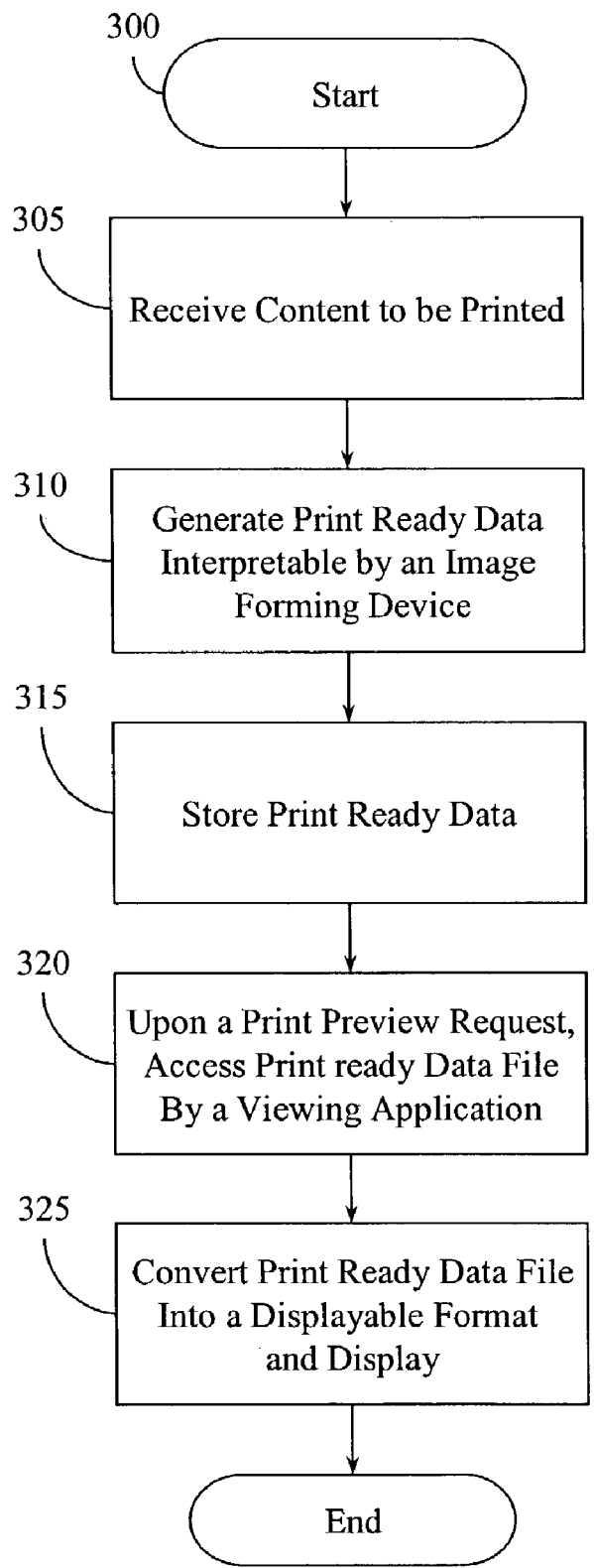
FIG. 3 is an example methodology for providing print preview capability.

With reference to FIG. 3, one embodiment of a methodology for processing a print preview request on a cellular telephone is provided. The illustrated elements denote "processing blocks" and represent software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

With reference to FIG. 3, if a selected content like a data file is desired to be printed, the selected content is received (Block 305). The selected content may be accessed from a local storage, received from a remote device, being currently processed by another application in which a print request is selected, contained in memory, or the like. Print-ready data is then generated from the selected content where the print-ready data is interpretable by an image forming device (Block 310). In one example, the print-ready data is in a device-independent format such as a page description language, a mark-up language, or the like. It will be appreciated that the format of the print-ready data will be a format common and interpretable by both the cellular telephone and imaging devices supporting that format. For example, the format may be based on the XHTML-print format. The print-ready data can then be stored on the cellular telephone (Block 315), for example, as a local object like a file, data in a memory buffer, or an object in another type of computer-readable medium.

In response to a print preview request, the print-ready data file is accessed by a viewing application (Block 320). As previously mentioned, a viewing software may include a web browser which can be loaded on the cellular telephone for browsing Internet-related web pages. The print-ready data file can then be converted by the viewing software into a displayable format and displayed (Block 325). For example, the page description language of the print-ready data can be converted into a rendered format that is displayable such as a format based on a hypertext markup language. In this manner, a cellular telephone can be print-enabled and provide an internal print preview component without relying on device specific print drivers and without using resources from devices external to the cellular telephone.

Figure 4:
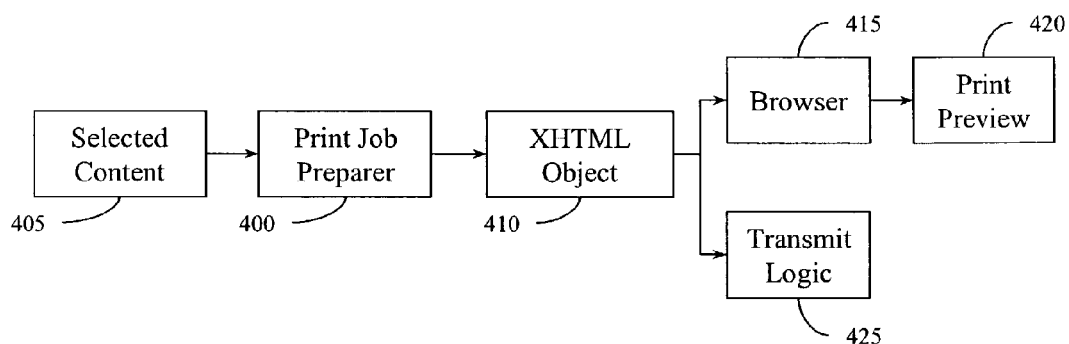
FIG. 4 is an example system diagram of processing a print job.

Illustrated in FIG. 4 is another embodiment of an internal print job processing system for a cellular telephone. The print job processing system includes a print job preparer 400 configured to prepare a print job from one or more selected content 405. In general, the print job is generated and formatted, including the content 405, into a format that is understandable and interpretable by an image forming device so that it can be printed. For example, the print job preparer 400 is configured to generate an XHTML object 410 from the selected content 405. The XHTML object 410 is based on a standard hypertext markup language that is device-independent. Thus, a device-specific bit map rendered image does not need to be generated for a selected image forming device.

The XHTML object 410 can be stored as a local file or other data object on the cellular telephone. The XHTML object 410 can then be viewed and/or transmitted for printing. For example, in response to a print preview request, a browser 415 can be instructed to access and display the XHTML object 410 to provide a print preview version of the selected content 405 based on the XHTML object 410. The browser 415 in this example can be internal to the cellular telephone and would be configured to interpret XHTML. Of course, other types of languages can be used. This allows a user to view a simulated print of the selected content 405 prior to transmitting the print job to an image forming device. It will be appreciated that if the browser 415 is not active on the cellular telephone when the print preview request is received, the browser 415 would be activated by the system.

With further reference to FIG. 4, in response to a print request, the XHTML object 410 would be transmitted to a selected image forming device using a transmit logic 420. In one embodiment the transmit logic 420 can be configured similar to wireless transceiver logic 145 shown in FIG. 1. It is assumed that the image forming device would be configured to interpret XHTML so that the print request can be completed.

Suitable software for implementing the various components of the present system and method using the teachings presented here include programming languages and tools such as Java, Pascal, C#, C++, C, HTML, CGI, Perl, SQL, APIs, SDKs, assembly, firmware, microcode, and/or other languages and tools. The components embodied as software include computer readable/executable instructions that cause one or more computers, processors and/or other electronic device to behave in a prescribed manner. Any software, whether an entire system or a component of a system, may be embodied as an article of manufacture and maintained as part of a computer-readable medium as defined previously. Another form of the software may include signals that transmit program code of the software to a recipient over a network or other communication medium. It will be appreciated that components described herein may be implemented as separate components or may be combined together.

To the extent that the term "includes" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described.

Accordingly, departures may be made from such details without departing from the spirit or scope of the applicant's general inventive concept.

We claim:

1. A cellular telephone comprising:
   a printing logic configured to generate printer ready data from a selected data to be printed where the printing logic converts the selected data from one data format to a different data format being the printer ready data;
   a viewing logic configured to interpret and display the printer ready data to simulate a printed state of the printer ready data; and
   a wireless communication logic configured to communicate the printer ready data to an image forming device in response to a transmit request.

2. The cellular telephone of claim 1 wherein the printer ready data has a format being interpretable by an image forming device and is device-independent.

3. The cellular telephone of claim 1 wherein the printer ready data is based on a page description language.

4. The cellular telephone of claim 1 wherein the printer ready data is based on XHTML.

5. The cellular telephone of claim 1 wherein the viewing logic is an internal web browser.

6. The cellular telephone of claim 5 wherein the internal web browser is configured to interpret a form of print ready data that is common to and interpretable by an image forming device.

7. The cellular telephone of claim 1 wherein the wireless communication logic includes a radio frequency transceiver.

8. The cellular telephone of claim 1 wherein the print ready data is stored as a local object and the viewing logic is configured to access and convert the local object into a displayable format.

9. The cellular telephone of claim 1 wherein the viewing logic and printing logic are contained on the cellular telephone and are configured to function independent of an external device.

10. The cellular telephone of claim 1 wherein the cellular telephone is a camera-enabled cellular phone.

11. An article of manufacture embodied in a computer-readable medium for use in a cellular telephone, the article of manufacture comprising:
    first processor executable instructions for causing a processor internal to the cellular telephone to convert, in response to a print preview request received by the cellular telephone, a selected content into a print ready format interpretable by an image forming device; and
    second processor executable instructions for causing a processor internal to the cellular telephone to display, in response to the print preview request received by the cellular telephone, a preview version of the print ready format on the cellular telephone to simulate a printed state of the printer ready format.

12. The article of manufacture as set forth in claim 11 wherein the print ready format is interpretable by a viewing software resident on the cellular telephone.

13. The article of manufacture as set forth in claim 12 wherein the viewing software is a web browser.

14. The article of manufacture as set forth in claim 11 wherein the print ready format is device independent.

15. The article of manufacture as set forth in claim 11 wherein the print ready format is based on a markup language.

16. The article of manufacture as set forth in claim 15 wherein the markup language is a hyper text markup language.

17. A print job control system in a cellular telephone, comprising:
    a print job preparer operably connected to a processor of the cellular telephone and configured to convert a selected content into a printer-ready rendered content based on a hypertext markup language;
    a print preview logic operably connected to the processor of the cellular telephone and configured to cause a browser executable by the processor to access the rendered content and display a print preview on a display of the cellular telephone based on the rendered content in response to a preview request received by the cellular telephone; and
    a print controller operably connected to the processor of the cellular telephone and configured to cause the cellular telephone to transmit the rendered content to an image forming device in response to a print request received by the cellular telephone.

18. The system of claim 17 where the print job control system is configured for a camera-enabled cellular telephone.

19. The system of claim 17 where the print job preparer is configured to store the rendered content as a local object on the cellular telephone.

20. The system of claim 17 where the print preview logic is configured to be operable within the cellular telephone without communicating with external devices.

21. The system of claim 17 where the browser is internal to the cellular telephone.

22. A method performable in a cellular telephone, the method comprising:
    receiving a data content by the cellular telephone;
    in response to a request, received by the cellular telephone, to view a printed version of the data content, the cellular telephone generating a page description language formatted data from the data content;
    rendering, by the cellular telephone, the page description language formatted data into a viewable format; and
    displaying the viewable format on a display on the cellular telephone.

23. The method as set forth in claim 22 where the page description language formatted data is generated based on an XHTML format.

24. The method as set forth in claim 22 where the viewable format is substantially similar to the printed version that can be generated by an image forming device.

25. The method as set forth in claim 22 where the receiving includes accessing the data content from a computer-readable medium.

26. The method as set forth in claim 22 where the receiving includes receiving the data content from a remote device.

27. The method as set forth in claim 22 where the page description language formatted data is stored as a local file on the cellular telephone.

28. The method as set forth in claim 22 where the generating, rendering, and displaying are performed on the cellular telephone independent from external devices.

29. The method as set forth in claim 22 where the viewable format is transmittable to an image forming device as part of a print job.

* * * * *